United States Patent
Bradfield et al.

(10) Patent No.: US 9,361,089 B2
(45) Date of Patent: Jun. 7, 2016

(54) SECURE PATCH UPDATES OF A VIRTUAL MACHINE IMAGE IN A VIRTUALIZATION DATA PROCESSING SYSTEM

(75) Inventors: Andrew J. Bradfield, Cortlant Manor, NY (US); Justo M. Guizan, Ridgefield, CT (US); John J. Thomas, Fishkill, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1335 days.

(21) Appl. No.: 12/177,703

(22) Filed: Jul. 22, 2008

(65) Prior Publication Data

US 2010/0287544 A1 Nov. 11, 2010

(51) Int. Cl.
*G06F 9/44* (2006.01)
*G06F 9/445* (2006.01)
*G06F 21/50* (2013.01)
*G06F 21/54* (2013.01)
*G06F 21/53* (2013.01)
*G06F 9/455* (2006.01)

(52) U.S. Cl.
CPC *G06F 8/65* (2013.01); *G06F 21/50* (2013.01); *G06F 21/53* (2013.01); *G06F 21/54* (2013.01); *G06F 9/44* (2013.01); *G06F 9/445* (2013.01); *G06F 9/45558* (2013.01); *G06F 2009/45587* (2013.01)

(58) Field of Classification Search
CPC ............... G06F 9/45533; G06F 9/455; G06F 2009/45587; G06F 2009/45595; G06F 21/50; G06F 21/53; G06F 2201/815; G06F 21/54; G06F 9/44; G06F 9/445; G06F 8/65
USPC ........................................ 717/172, 168; 718/1
See application file for complete search history.

(56) References Cited

U.S. PATENT DOCUMENTS

| | | | |
|---|---|---|---|
| 2005/0235045 A1* | 10/2005 | Narayanaswami ... | G06F 9/4406 709/217 |
| 2007/0180448 A1* | 8/2007 | Low et al. ......................... | 718/1 |
| 2007/0271561 A1* | 11/2007 | Winner et al. .................... | 718/1 |
| 2008/0244747 A1* | 10/2008 | Gleichauf ........... | G06F 11/1415 726/25 |
| 2009/0007105 A1* | 1/2009 | Fries et al. ........................ | 718/1 |

* cited by examiner

*Primary Examiner* — John Breene
*Assistant Examiner* — Lynda Dinh
(74) *Attorney, Agent, or Firm* — Steven M. Greenberg, Esq.; CRGO Law

(57) ABSTRACT

Virtual Machine (VM) images in a virtualized environment are updated through the use of patches. A virtualization data processing system includes a hypervisor that manages a VM image. The hypervisor is configured to retrieve a patch for an instance of the VM image from a secure site. The hypervisor blocks all other network access to the VM image. The hypervisor is configured to apply the patch to the instance of the VM image and unblock all network access to the VM image

14 Claims, 2 Drawing Sheets

SECURE PATCH UPDATES OF A VIRTUAL MACHINE IMAGE IN A VIRTUALIZATION DATA PROCESSING SYSTEM

BACKGROUND OF THE INVENTION

The present invention relates to the field of virtualization and more particularly to patch updating virtualized computing environments.

Virtualization as a technology aims to interject a layer between the hardware platform and operating system and executing applications. In a server running in a non-virtualized environment, there is typically one operating system, which may in turn run multiple applications. In a virtual environment a single server is logically partitioned into multiple environments each of which may run multiple operating systems and multiple applications. Virtualization therefore, allows users to consolidate multiple physical machines into one physical machine by having the one physical machine support multiple virtual environments. Virtualization has proven useful for those end users requiring separate computing environments for different types of applications while in fact only deploying a single hardware platform.

The hypervisor has become a ubiquitous virtualization layer for client and server systems designed to isolate a guest operating system by running the operating system in an isolated run-time environment on a single hardware platform. The virtualized environment provided by the hypervisor may ensure a degree of security by isolating the operating system from other guest operating systems sharing the same hardware platform.

In the virtualized environment, vulnerabilities can be identified in one or more of the computing environments consolidated in a virtualized environment. As vulnerabilities are identified, patches can be applied to rectify the identified vulnerabilities. To that end, patch management and the updating of VM images in a virtualized environment remains an area that can be especially important in respect to virtualization security. Referring to FIG. 1, a conventional virtualization data processing system can be configured to update VM images.

As shown in FIG. 1, a host computing platform 110 can support the operation of a hypervisor 120 managing multiple different VM images 160, 161, 162. Each of the VM images 160, 161, 162 can provide a computing environment for one or more corresponding applications 170 marked App. The hypervisor 120 can establish a configuration 150 for each different one of the VM images 160, 161, 162 specifying requisite access to computing resources 130 provided by the host computing platform 110, for instance processor, memory, file system, communications.

Notably, the VM images 160, 161, 162 are vulnerable to attacks 140, 141 until patch 195 from different patch sites 190 is applied. Thus, the skilled artisan will recognize that security controls for protecting the computing environments 160, 161, 162 etc. rely on the security provided by those computing environments. Therefore when VM images 160, 161, 162 are individually instantiated without respective patch 195, those VM images 160, 161, 162 remain vulnerable to attacks 140, 141. This vulnerability persists until the patch 195 is individually applied over computer communications network 180.

Of importance, the ability to suspend a VM image in its current state permits a suspended instance VM image to be released from suspension and re-activated in a vulnerable state—that is a state where patches have not yet been applied to the VM image.

BRIEF SUMMARY OF THE INVENTION

Embodiments of the present invention can include a virtualization data processing system. The system can include a hypervisor, and a VM image managed by the hypervisor. The hypervisor can be configured to retrieve a patch to an instance of a VM image from a secure site and block all other network access to the VM image. In one aspect of the embodiment, the hypervisor can include patch updating logic to retrieve the patch to the instance of the VM image from the secure site. In another aspect of the embodiment, the hypervisor can be further configured to apply the patch to the instance of the VM image and unblock all network access to the VM image. The VM image can include a computer operating system. Also, computer middleware can execute within the VM image. Yet further, a computer application can execute within the VM image. Even yet further, an application server can execute within the VM image.

Embodiments of the invention also can include a method for patch updating a VM image. The method can include retrieving a patch to an instance of a VM image from a secure site, and blocking all other network access to the VM image. The method further can include applying the patch to the instance of the VM image, and unblocking network access to the VM image. In one aspect of the embodiment, blocking all other network access to the VM image can include prompting a user to manually select blocking all other network access. In another aspect of the embodiment, blocking all other network access to the VM image can induce detecting a need to patch the instance of the VM image and automatically blocking all other network access to the VM image. In yet a further aspect of the embodiment, the method can include checking for an availability of the patch from a compiled list of secure patch updating web sites. Finally, in even yet another aspect of the embodiment, retrieving a patch to an instance of a VM image from a secure site can include identifying the remote secure site from which to retrieve the patch to the instance of the VM image.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
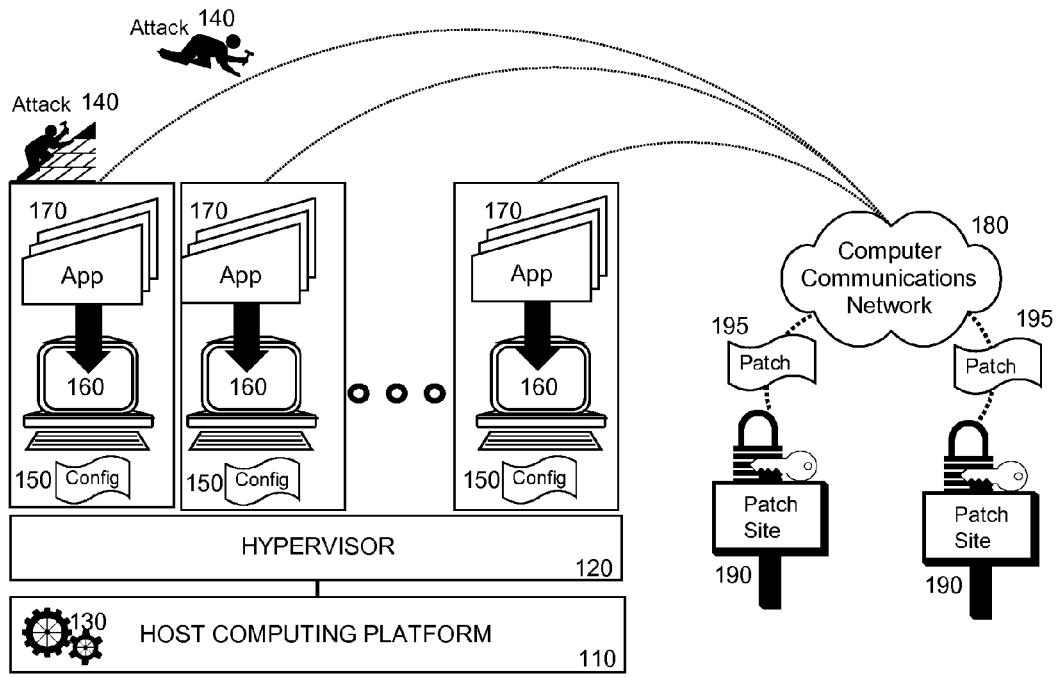
FIG. 1 is a pictorial illustration of a virtualization data processing system configured to update VM images as known in the art.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments of the present invention provide a method, system and computer program product for securely updating a VM image in a virtualization data processing system. In an embodiment of the invention, a VM image can be securely updated within a virtualization data processing system while network access is blocked to all web sites except a designated secure patch site or other sites known to be secure. In this regard, a hypervisor managing an instance of a VM image can include an extension of program logic that has been enabled to direct the blocking of network access while downloading a patch to the VM image from a designated secure site. Accordingly, an instance of a VM image in the hypervisor can become fully patched before an outside attack can be attempted upon the VM image.

Figure 2:
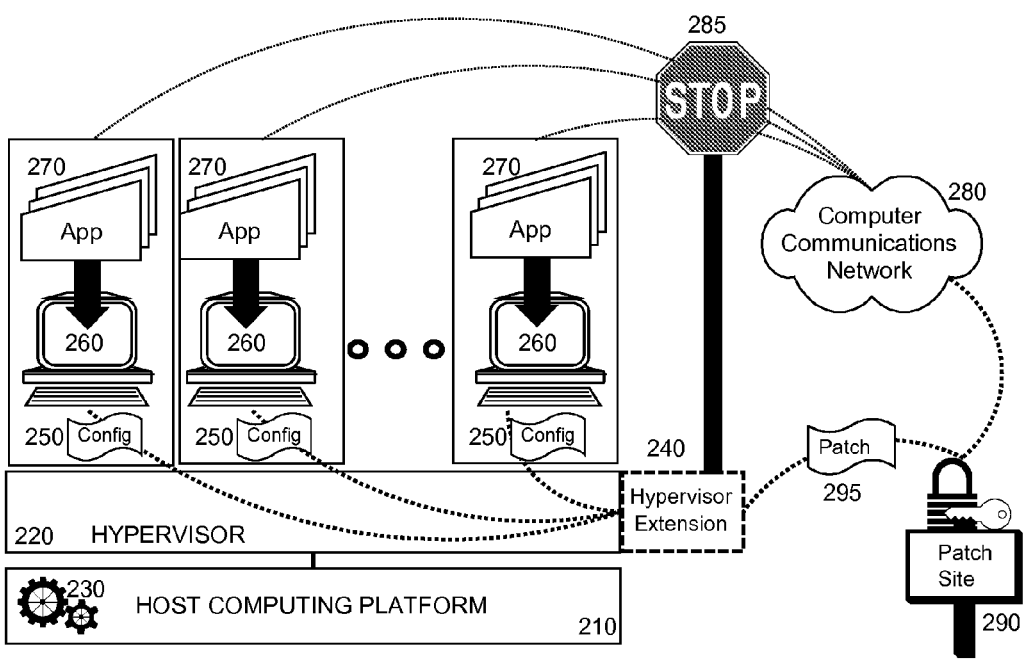
FIG. 2 is a pictorial illustration of a hypervisor extension configured to update VM images for a virtualization data processing system.

In further illustration, FIG. 2 is a pictorial illustration of a hypervisor extension configured to update VM images for a virtualization data processing system. As shown in FIG. 2, a host computing platform 210 can include a hypervisor 220 managing multiple different VM images 260, 261, 262. Each of the VM images 260, 261, 262 managed by the hypervisor can provide a computing environment for one or more corresponding applications 270, for example a guest operating system, an application server, an end user computer program, or even middleware, to name only a few possibilities. As part of the computing environment, the hypervisor 220 can provide a configuration 250 for each different one of the VM images 260, 261, 262 specifying requisite access to computing resources 230 provided by the host computing platform 210, for instance processor, memory, file system, communications and even other ones of the VM images 260, 261, 262. Yet further, the hypervisor 220 can be configured to monitor each of the VM images 260, 261, 262 in order to determine whether or not a given one of the VM images 260, 261, 262 requires patch updating.

Notably, a hypervisor extension 240 to the hypervisor 220 can be provided. The hypervisor extension 240 can include program code enabled to facilitate the secure patch updating of the VM images 260, 261, 262 over a computer communications network 280 as managed by the hypervisor 220. In this regard, when a patch 295 is ready for download from a secure patch site 290 to be applied to a selected one of the VM images 260, 261, 262, the program code of the hypervisor extension 240 can be enabled to direct the blocking of open network access 285 to the selected one of the VM images 260, 261, 262 by external sites not known to be secure, excepting for access to the secure patch site 290 that is known to be secure. Optionally, the program code of the hypervisor extension 240 further can be enabled while open network access 285 has been blocked, to download the patch 295 from the secure patch site 290 and to apply the patch 290 to the selected one of the VM images 260, 261, 262.

Figure 3:
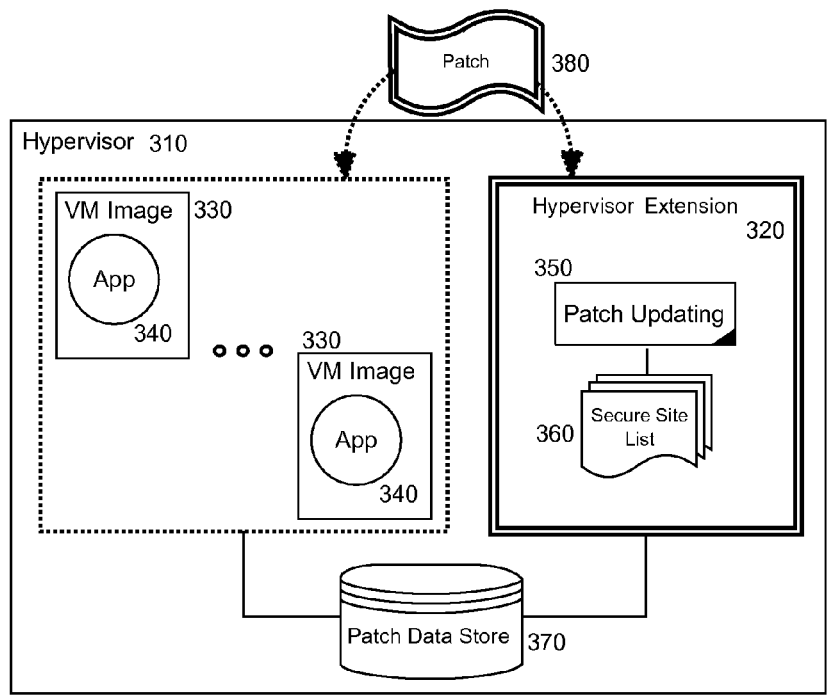
FIG. 3 a schematic illustration of a hypervisor implementation of a virtualization data processing system configured to update VM images.

In yet further illustration, FIG. 3 schematically shows a hypervisor implementation of a virtualization data processing system configured to securely update a VM image. The system can include a hypervisor 310 disposed in a host computing platform. The hypervisor 310 can be configured to create and manage multiple, different VM images 330, each of the VM images supporting the execution of one or more applications 340. For instance, each of the VM images 330 can include a guest operating system, one or more application instances, middleware, or even an application server, by way of example. Notably, the hypervisor 310 also can include a hypervisor extension 320 to the hypervisor 310.

Specifically, the hypervisor extension 320 can include patch updating logic 350 enabled to instantiate a VM image, block network access to the hypervisor (or VM image) other than from a remote secure site providing one or more patches to the hypervisor (or VM image), all the while retrieving one or more pertinent patches 380 for the VM image from the remote secure patch site. Optionally, the remote secure patch site can be listed in a designated secure site list 360. In any case, the patch updating logic 350 can be further enabled to store downloaded patches 380 in a patch data store 370. Finally, the program code of the patch updating logic 350 can be enabled to apply the downloaded patches 380 to the VM image 330. In this way, the VM image 330 can be securely updated within a virtualized platform without permitting a remote attack on the VM image 330 during the patch updating process.

Figure 4:
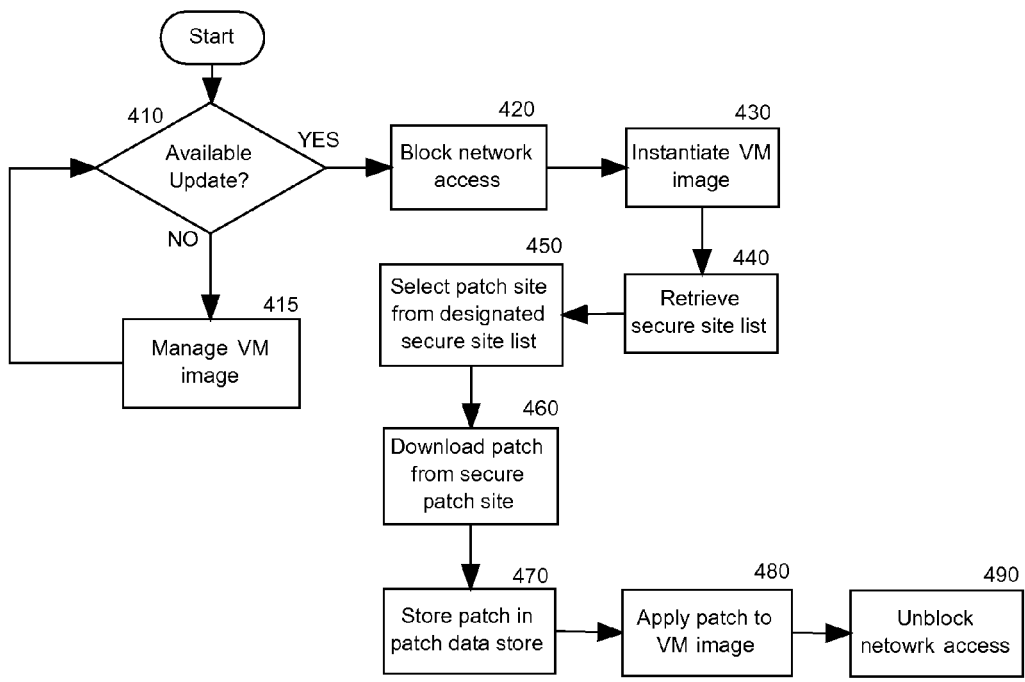
FIG. 4 is a flow chart illustrating a process for updating a VM image in a virtualization data processing system.

In even yet further illustration of the operation of the patch updating logic, FIG. 4 is a flow chart illustrating a process for updating a VM image in a virtualization data processing system. Beginning in block 410, one or more patches can be identified as available for application to the VM image. A source from which the patch or patches can be downloaded can also be identified, for example, by reference to a compiled list of secure patch updating sites. The determination of whether or not to apply an available patch can be resolved manually by user specification (for example, in changing a computing environment from a production mode to a testing mode). Alternatively, this determination can be resolved automatically by monitoring the configuration of different VM images, and based upon the configuration of the monitored VM images, identifying a particular one of the VM images requiring a patch update. In either circumstance, if there are no available updates then the VM image can be allowed to keep checking for a patch update in block 415.

If there is an available patch update for a selected VM image, then in block 420 the VM image can block network access to all sites except the designated secure patch site, or other sites known to be secure, for example known secure sites might be listed in the secure site list. Blocking network access can be done automatically or through manual instruction. When network access is blocked, the hypervisor can restrict network access so that there is exclusive communication only between the hypervisor (and VM image) and the patch site. Next in block 430, a VM image can be instantiated by creating and activating an instance of a VM image. Once the VM image has been instantiated, in block 440 a secure site list of patch sites (including websites, FTP sites, network sites) can be consulted to identify available secure sites from which a required patch update can be retrieved. Thereafter, in block 450 a patch site can be selected from the secure site list.

In block 460, a patch can be downloaded from a secure patch site utilizing a secure network connection. In this regard, the secure network connection can be established according to known techniques of securing communications including public key cryptography. As an additional security feature, the hypervisor and the patch updating extension can be configured to communicate only with the patch site when in patch mode. Alternatively, the hypervisor can be configured to restrict network access by only allowing communication between the VM image selected to be patched and the patch site. In either case, in block 470 each patch downloaded from the patch site can be stored in a patch data store, and in block 480, each patch can be retrieved from the patch data store and applied to the VM image. Subsequently, in block 490 the hypervisor can unblock network access resulting in the lifting of network communications restrictions. Since the VM image will have been fully patched, the VM image no longer will be vulnerable to the identified security threat and, in consequence, patch updating of the VM images can enable the particular one of the VM images to become fully patched before an outside attack can be attempted.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A virtualization data processing system comprising:
a hypervisor executing in a host computing platform; and
a plurality of different virtual machine (VM) images managed by the hypervisor;
wherein the hypervisor is configured to
monitor each of the VM images in order to determine whether or not any of the VM images requires patch updating,
upon detecting that a VM image requires patch updating, retrieve a patch to an instance of the VM image from a remote secure site executing on a computer separate and different from the host computing platform of the hypervisor,
block other network access to the VM image during patch retrieval of the VM image comprising restricting network access to exclusive communication via a computer communications network between only the hypervisor executing in the host computing platform and the remote secure site executing on the computer and
while other network access is blocked, apply the patch within the host computing platform to the instance of the VM image and subsequently unblock all network access to the VM image after the patch has been applied within the host computing platform to the instance of the VM image.

2. The system of claim 1, wherein the hypervisor comprises patch updating logic comprising program code enabled to retrieve the patch to the instance of the VM image from the remote secure site.

3. The system of claim 1, wherein the VM image comprises a computer operating system.

4. The system of claim 3, further comprising computer middleware executing within the VM image.

5. The system of claim 3, further comprising a computer application executing within the VM image.

6. The system of claim 3, further comprising an application server executing within the VM image.

7. A method for patch updating a virtual machine (VM) image, the method comprising:
monitoring each of a plurality of different VM images managed by a hypervisor in order to determine whether or not any of the VM images requires patch updating, the hypervisor when executing in the host computing platform and upon detecting that a VM image requires patch updating:
retrieving a patch to an instance of the VM image from a remote secure site executing on a computer separate and different from a host computing platform of the hypervisor;
blocking other network access to the VM image during patch retrieval of the VM image comprising restricting network access to exclusive communication via a computer communications network between only the hypervisor executing in the host computing platform and the remote secure site executing on the computer;
applying, while other network access is blocked, the patch within the host computing platform to the instance of the VM image; and,
subsequently unblocking network access to the VM image after the patch has been applied within the host computing platform to the instance of the VM image.

8. The method of claim 7, wherein blocking other network access to the VM image comprises prompting a user to manually select blocking other network access.

9. The method of claim 7, wherein blocking other network access to the VM image comprises detecting a need to patch the instance of the VM image and automatically blocking other network access to the VM image.

10. The method of claim 7, further comprising checking for an availability of the patch from a compiled list of secure patch updating web sites.

11. A computer program product for patch updating a VM image, the computer program product comprising:
a non-transitory computer usable storage medium having computer usable program code embodied therewith, the computer usable program code comprising:
computer usable program code for monitoring each of a plurality of different VM images managed by a hypervisor in order to determine whether or not any of the VM images requires patch updating, the hypervisor when executing in a host computing platform and upon detecting that a VM image requires patch updating:
retrieving a patch to an instance of the VM image from a remote secure site executing on a computer separate and different from the host computing platform of the hypervisor;
blocking other network access to the VM image during patch retrieval of the VM image comprising restricting network access to exclusive communication via a computer communications network between only the hypervisor executing in the host computing platform and the remote secure site executing on the computer;
applying, while other network access is blocked, the patch within the host computing platform to the instance of the VM image; and,
subsequently unblocking network access to the VM image after the patch has been applied within the host computing platform to the instance of the VM image.

12. The computer program product of claim 11, wherein the computer usable program code for blocking other network access to the VM image comprises computer usable program code for prompting a user to manually select blocking other network access.

13. The computer program product of claim 11, wherein the computer usable program code for blocking other network access to the VM image comprises computer usable program code for detecting a need to patch the instance of the VM image and automatically blocking other network access to the VM image.

14. The computer program product of claim 11, further comprising computer usable program code for checking for an availability of the patch from a compiled list of secure patch updating web sites.

* * * * *